United States Patent
Shibahara et al.

(10) Patent No.: US 10,698,272 B2
(45) Date of Patent: Jun. 30, 2020

(54) DISPLAY DEVICE HAVING A DISPLAY CELL WITH BONDING AGENT CONFIGURATION

(75) Inventors: Seiji Shibahara, Chiba (JP); Shizuo Mizukami, Yamanashi (JP)

(73) Assignee: SATURN LICENSING LLC, New York, NY (US)

( * ) Notice: Subject to any disclaimer, the term of this patent is extended or adjusted under 35 U.S.C. 154(b) by 475 days.

(21) Appl. No.: 13/253,276

(22) Filed: Oct. 5, 2011

(65) Prior Publication Data

US 2012/0092817 A1 Apr. 19, 2012

(30) Foreign Application Priority Data

Oct. 13, 2010 (JP) ................. P2010-230489

(51) Int. Cl.
*G02F 1/1345* (2006.01)
*G02F 1/1333* (2006.01)

(52) U.S. Cl.
CPC ........ *G02F 1/13452* (2013.01); *G02F 1/1345* (2013.01); *G02F 2001/133311* (2013.01); *G02F 2001/133331* (2013.01); *G02F 2201/50* (2013.01)

(58) Field of Classification Search
None
See application file for complete search history.

(56) References Cited

U.S. PATENT DOCUMENTS

| | | | | |
|---|---|---|---|---|
| 6,833,670 | B2 * | 12/2004 | Mayuzumi | H05B 33/04 313/506 |
| 8,610,837 | B2 * | 12/2013 | Kobayashi et al. | 349/12 |
| 2002/0135727 | A1 | 9/2002 | Nakaminami et al. | |
| 2003/0006698 | A1 * | 1/2003 | Mayuzumi | H05B 33/04 313/506 |
| 2008/0165483 | A1 * | 7/2008 | Tanaka et al. | 361/681 |
| 2008/0204645 | A1 * | 8/2008 | Kawabe et al. | 349/123 |
| 2009/0066862 | A1 | 3/2009 | Ishii et al. | |
| 2012/0092817 | A1 * | 4/2012 | Shibahara et al. | 361/679.01 |

FOREIGN PATENT DOCUMENTS

JP 2010079006 A 4/2010

OTHER PUBLICATIONS

Machine translation of Morikawa JP 2010-079006 patent publication from INPIT.*

(Continued)

*Primary Examiner* — Andrew Jordan
(74) *Attorney, Agent, or Firm* — Oblon, McClelland, Maier & Neustadt, L.L.P.

(57) ABSTRACT

A display device including: a display cell that includes a first substrate and a second substrate that are arranged to be opposing, includes a wiring region that is wider than the first substrate on the second substrate, and includes an electrode in the wiring region; a wiring substrate in which at least a portion is arranged to be opposing the wiring region and which is electrically connected to the electrode; a front panel that is provided on a front surface of the first substrate; and a desiccating bonding agent that fixes the front panel to the first substrate while covering from at least a portion of a side surface of the first substrate to a connection portion between the electrode and the wiring substrate.

21 Claims, 5 Drawing Sheets

(56) References Cited

OTHER PUBLICATIONS

European Search Report EP 11180706, dated Nov. 16, 2011.
Office Action dated Aug. 2, 2016 in European Application No. 11180706.1.
Katsuhiko Kishi, "Visible-Light-Curing Resin" Three Bond Co., Ltd., Three Bond Technical News, Jul. 1, 1995 (8 pages).
Thomas Brock, "Strahlenhärtende Systeme", Römpp, 2005, 10 pages (with English language translation).

* cited by examiner

DISPLAY DEVICE HAVING A DISPLAY CELL WITH BONDING AGENT CONFIGURATION

CROSS-REFERENCE TO RELATED APPLICATION

The present application claims priority from Japanese Patent Application No. JP 2010-230489 filed in the Japanese Patent Office on Oct. 13, 2010, the entire content of which is incorporated herein by reference.

BACKGROUND

The present disclosure relates to a display device such as a liquid crystal display panel.

Although various types of display panels such as liquid crystal display panels and PDPs (Plasma Display Panels) have been developed, liquid crystal display panels are particularly thin and light, and have low power consumption. Liquid crystal display panels are therefore widely used for image display devices such as televisions, office equipment such as PCs (Personal Computers), and mobile terminals such as mobile phones, PDAs (Personal Digital Assistants), PDA phones, mobile game consoles, and tablet PCs, or the like.

Input of a signal or the like is used for driving various types of display panels including such liquid crystal display panels. For example, as a method of connecting a display panel and a driver IC (Integrated Circuit) that transmits an image signal, a method of connecting a printed circuit electrode of a printed circuit substrate and an electrode of a pixel via an ACF (Anisotropic Conductive Film) is widely known. With such a method, there is a case when a method of coating a connection portion of the ACF with a desiccant in order to prevent the infiltration of moisture into the connection portion is used.

In addition, with the various types of display devices, it is known that a front panel such as a cover substrate (decorative panel) or a touch panel is installed on a front surface (surface on the display side) of the display panel from the viewpoint of surface protection, aesthetics, or functionality. Such a type of front panel is used by being adhered on the entire surface of the front surface of a display panel. For example, a display device in which the front panel is bonded with the front surface of a liquid crystal display panel by a resin has been reported (for example, refer to Japanese Unexamined Utility Model Registration Application Publication No. 2-27121). Since a resin for bonding such a front panel with a display panel and a resin for coating a connection portion each have different objectives, different resin materials are used.

SUMMARY

However, there has been a problem that in a case when materials of different types are used for the adhesive (member for bonding a front panel with a display panel) and the desiccant (member for coating a connection portion of an ACF), the manufacturing cost becomes high.

That is, the manufacturing cost rises due to adjusting the respective materials in separate steps or using different types of materials. Moreover, in a case when the bonding agent seeps out to the connection portion of the ACF, reactivity with the desiccant is verified in advance, and the influence on reliability is considered. The manufacturing cost also rises due to such considerations.

Furthermore, the following problems occur as a result of bonding the front panel to the display panel in a state in which a desiccant is already present. That is, if there is a large amount of desiccant, the front panel contacts the desiccant, and it is difficult to affix the front panel in a state of being parallel to the display panel. Further, for example, if an ultraviolet curing resin is used as the bonding agent, ultraviolet light is blocked by the desiccant, and regions in which curing is insufficient appear. In addition, a problem in which the desiccant degrades due to the irradiation of ultraviolet light occurs.

It is desirable to provide a display device that is low-cost, reliable, and easy to manufacture.

A display according to an embodiment of the disclosure includes: a display cell that includes a first substrate and a second substrate that are arranged to be opposing, includes a wiring region that is wider than the first substrate on the second substrate, and includes an electrode in the wiring region; a wiring substrate in which at least a portion is arranged to be opposing the wiring region and which is electrically connected to the electrode; a front panel that is provided on a front surface of the first substrate; and a desiccating bonding agent that fixes the front panel to the first substrate while covering from at least a portion of a side surface of the first substrate to a connection portion between the electrode and the wiring substrate.

In such a display device, the desiccating bonding agent fixes the front panel to the first substrate and coats the connection portion between the wiring substrate and the electrode. The desiccating bonding agent is more preferably provided continuously from the bonding surface of the first substrate and the front panel to the connection portion between the electrode and the wiring substrate via a side surface of the first substrate, and may further cover at least a portion of the front surface of the wiring substrate.

According to a display device according to an embodiment of the disclosure, since the fixing of the front panel to the first substrate and the coating of the connection portion between the wiring substrate and the electrode are both performed by the desiccating bonding agent, the number of the types of materials that are used and the number of manufacturing steps are able to be reduced. In so doing, manufacturing costs are able to be kept down. Further, it is possible to perform fixing of the front panel to the first substrate and coating of the connection portion between the wiring substrate and the electrode at the same time without having to provide a desiccant in advance. Therefore, problems that have occurred by providing the desiccant in advance are resolved, and a highly reliable display device using simple manufacturing steps is able to be obtained.

DETAILED DESCRIPTION OF EMBODIMENTS

Embodiments of the disclosure will be described in detail below with reference to the drawings. Here, description will be given in the following order.

1. EMBODIMENTS

Display device that performs fixing of a front panel and coating of a wiring portion by a desiccating bonding agent 2. Modified Example 1

Display device in which a portion of a flexible wiring substrate is covered by a desiccating bonding agent 3. Modified Example 2

Display device in which a portion of a flexible wiring substrate is covered by a desiccating bonding agent Embodiments Configuration of Display Device 1

Figure 1:
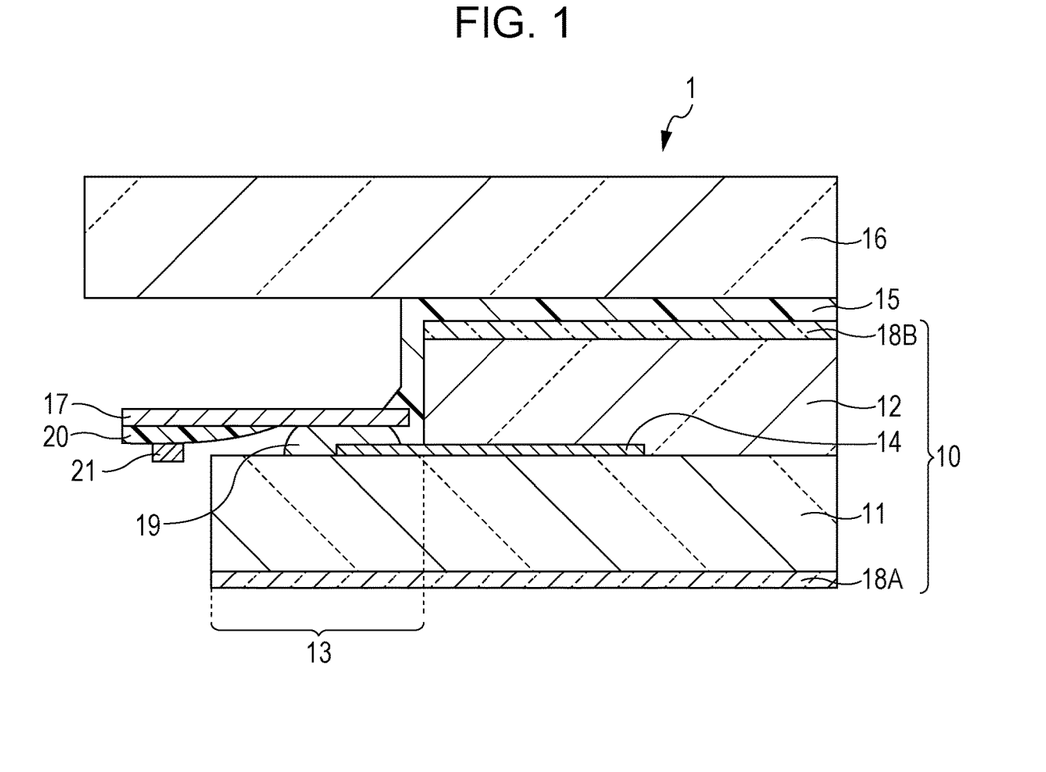
FIG. 1 is a side cross-sectional diagram that represents a configuration of a display device according to an embodiment of the disclosure.
Figure 2:
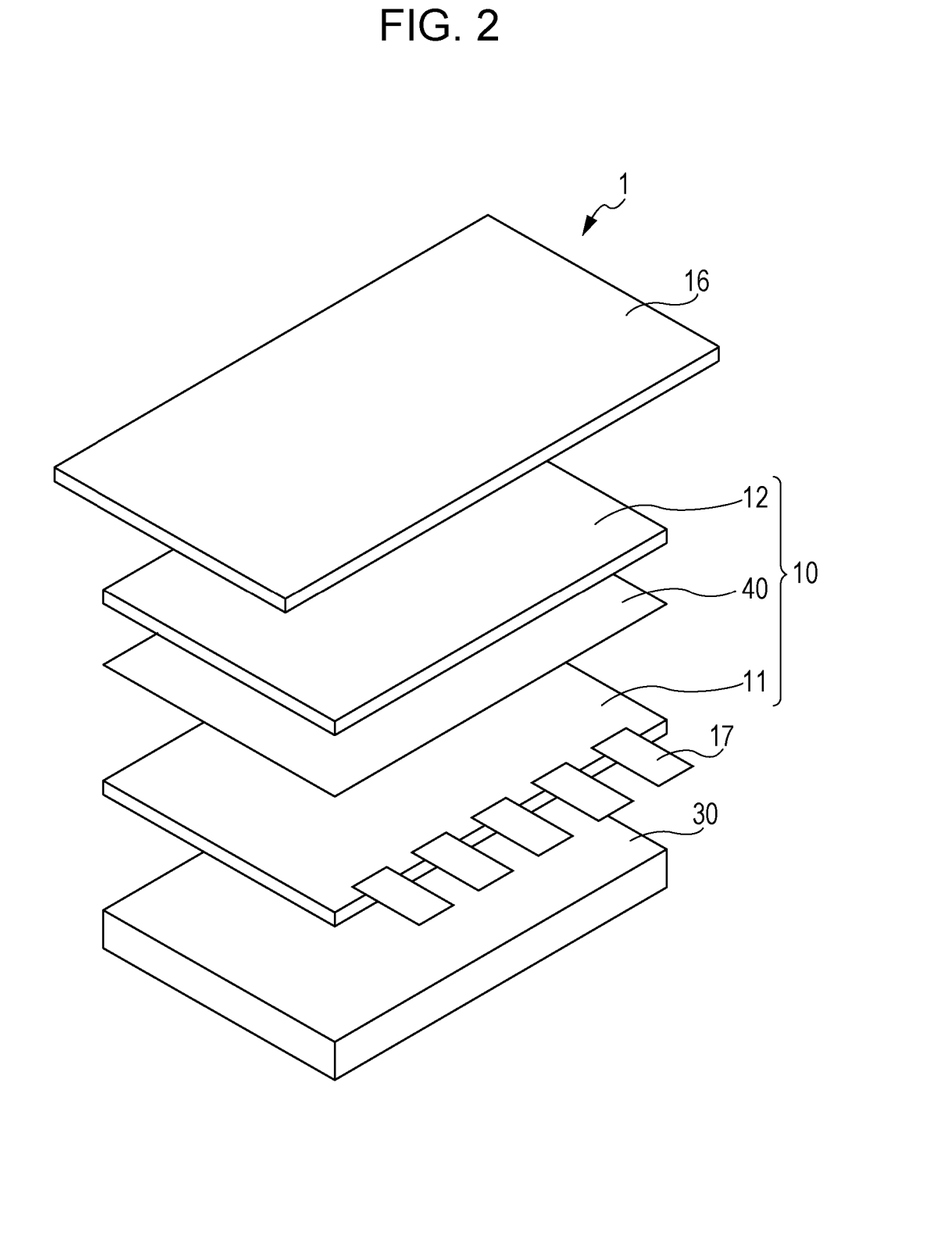
FIG. 2 is an exploded perspective diagram that represents a configuration of the display device that is illustrated in FIG. 1.

FIG. 1 is a side cross-sectional diagram that represents an outline configuration of a display device 1 (for example, a liquid crystal display device) according to an embodiment of the disclosure, and FIG. 2 is an exploded perspective diagram of the display device 1. The display device 1 includes a display cell 10, and a wiring substrate, for example, a flexible wiring substrate 17 is connected to the display cell 10. Image display is performed by the display cell 10 being driven by an image signal that is supplied by a driver IC 21 that is mounted on the wiring substrate 17. A front panel 16 and a backlight unit 30 are respectively provided on a front surface side (display side) and a back surface side (back side) of the display cell 10.

The specifics of each of the parts are described below.
(Display Cell)

As illustrated in FIG. 2, the display cell 10 has a lower substrate 11 (second substrate) on the back surface side and an upper substrate 12 (first substrate) on the front surface side which are arranged to be opposing, and includes a liquid crystal layer 40 between the lower substrate 11 and the upper substrate 12. As illustrated in FIG. 1, the area of the lower substrate 11 is greater than that of the upper substrate 12, and the widening region of the lower substrate 11 is the wiring region 13. An electrode 14 is provided in the wiring region 13, and a flexible wiring substrate 17 is electrically connected to the electrode 14 via an ACF 19. An alignment film (not shown), for example, is provided between the lower substrate 11 and the upper substrate 12, and the liquid crystal layer 40 is sealed therebetween by a sealant (not shown). The lower substrate 11 and the upper substrate 12 are composed of transparent substrates such as, for example, a glass substrate or an acrylic sheet. A protective film for preventing the permeation of alkali ions may be provided on the surface of the glass substrate. That glass substrate may use glass with, for example, a refractive index (nD) of 1.49 to 1.50, or may use reinforced glass with a refractive index of approximately 1.55. The acrylic sheet preferably has a refractive index of 1.51 to 1.52. A color filter and a black matrix (not shown), for example, are formed on the back surface side of the upper substrate 12, that is, on the opposing surface of the lower substrate 11. The color filter and the black matrix may be formed on the lower substrate 11.

The wiring region 13 on the lower substrate 11 side may be provided at one location on the lower substrate 11 or may be provided at a plurality of locations. The electrode 14 that is provided on the wiring region 13 is for transmitting image signals that are supplied from the driver IC 21 through the flexible wiring substrate 17 to each pixel. Chromium, aluminum, molybdenum, neodymium, copper, titanium, or magnesium, for example, is used for the electrode 14. The electrode 14 may be formed as an alloy or with a multilayer structure. For example, if the electrode 14 is formed of copper and a glass substrate is used as the lower substrate 11, since there is a case when sufficient adhesion is not obtained, an alloy including copper or a multilayer structure with other metals is used for the electrode 14.

A polarizer 18A and a polarizer 18B are respectively pasted on the back surface side of the lower substrate 11 and the front surface side of the upper substrate 12. The polarizers 18A and 18B are configured, for example, by providing polyvinyl alcohol (PVA) between two sheets of triacetyl cellulose (TAC). At this time, the triacetyl cellulose functions as a protective layer and the polyvinyl alcohol functions as a polarizing layer. Here, the polarizers 18A and 18B are arranged such that the absorption axis direction of one is orthogonal to that of the other.
(Front Panel)

A desiccating bonding agent 15 is provided between the polarizer 18B and the front panel 16, and the front panel 16 is fixed on the upper substrate 12 by the desiccating bonding agent 15 with the polarizer 18B therebetween. The front panel 16 is provided in order to improve surface protection, aesthetics, and functionality of the display cell 10, and is, for example, a cover substrate (decorative panel), a touch panel, or the like. The front panel 16 is composed, for example, of a glass substrate or an acrylic sheet, and an optical layer such as an antireflection film, a light-blocking film, or a field of view controlling film may be provided. The glass substrate may use glass, for example, with a refractive index (nD) of 1.49 to 1.50, or may use reinforced glass with a refractive index of approximately 1.55. A refractive index of 1.51 to 1.52 is preferable for the acrylic sheet.
(Flexible Wiring Substrate)

As well as mounting the driver IC 21, the flexible wiring substrate 17 has the electrode 14 that is electrically connected to the back surface thereof (opposing surface to the lower substrate 11) via the ACF 19. The connection portion between the flexible wiring substrate 17 and the electrode 14 is positioned in the vicinity of an end portion of the upper substrate 12. In regions of the flexible wiring substrate 17 other than where the ACF 19 is provided, circuit patterns are protected by a solder resist 20 (protective agent).
(Desiccating Bonding Agent)

The desiccating bonding agent 15 is provided in a state of covering from the entire front surface of the upper substrate 12 (polarizer 18B) to the connection portion between the flexible wiring substrate 17 and the electrode 14 via a side surface of the upper substrate 12. In other words, the desiccating bonding agent 15 continuously covers from the front surface through the side surface of the upper substrate 12 to the connection portion between the flexible wiring substrate 17 and the electrode 14 of the wiring region 13. Since the connection portion between the flexible wiring substrate 17 and the electrode 14 is present in the vicinity of the upper substrate 12 of the wiring region 13, the desiccating bonding agent 15 is provided to cover the gap between the upper substrate 12 and the lower substrate 11. The desiccating bonding agent 15 has a function as a bonding agent that fixes the front panel 16 on the upper substrate 12, and a function as a desiccant that covers the connection portion between the flexible wiring substrate 17 and the electrode 14 and which prevents the infiltration of moisture. In the present embodiment, by using the same material for the bonding agent and the desiccant in such a manner, the number of types of materials used and the number of manufacturing steps are able to be reduced. Here, although the desiccating bonding agent 15 continuously covers from the front surface of the upper substrate 12 to the connection portion between the flexible wiring substrate 17 and the electrode 14 in the embodiment, as long as the desiccating bonding agent 15 is provided over the front surface of the upper substrate 12 and the connection portion between the flexible wiring substrate 17 and the electrode 14, the sections in between may be cut off.

A resin material, for example, is able to be used as the desiccating bonding agent 15. Once a resin composition is provided on the connection portion between the flexible wiring substrate 17 and the electrode 14 which is between the polarizer 18B that is provided on the upper substrate 12 and the front panel 16 and which is through the ACF 19, the resin composition is cured, for example, by irradiating light, and fixing of the front panel 16 and coating of the connection portion are performed. That is, fixing of the front panel 16 to the upper substrate 12 and coating of the connection portion between the flexible wiring substrate 17 and the electrode 14 are performed at the same time. In so doing, problems that have occurred from bonding the front panel 16 in a state of providing a desiccant in advance as described above are resolved, and a highly reliable display device using simple manufacturing steps is able to be obtained.

The resin material that is used for the desiccating bonding agent 15 may be an ultraviolet curable resin or a visible light curing resin. This is because with a photo-curable resin, it is possible to cure a resin composition that is formed over a wide range from the front surface of the upper substrate 12 to the connection portion between the flexible wiring substrate 17 and the electrode 14 in a short amount of time. In a case when a visible light curing resin is used, it is possible to suppress the degradation of the liquid crystal layer 40, the flexible wiring substrate 17, and the polarizers 18A and 18B from light irradiation.

It is preferable that the desiccating bonding agent 15 include an acrylate resin or an epoxy resin. This is because acrylate resins and epoxy resins have excellent desiccating properties, adhesion properties, and binding properties. In addition, by including an acrylate resin, it is possible to adjust the hardness of a cured material from soft to hard easily.

A resin material composed of, for example, a polymer, an acrylate monomer, or a photopolymerization initiator is used as the above desiccating bonding agent 15. One or more selected from a group including polyurethane acrylate, hydrogenated terpene resin, butadiene polymer, polyisoprene acrylate, and an ester compound thereof is included as the polymer; one or more selected from a group including isobornyl acrylate, dicyclopentenyloxyethyl methacrylate, and 2-hydroxylbutyl methacrylate is included as the acrylate polymer; and one or more selected from a group including 1-hydroxy-cyclohexyl-phenyl-ketone (product name IRGACURE 184 (trademark), Chiba Speciality Chemicals Corp.) and 2,2-dimethoxy-1,2-diphenyl-ethan-1-one (product name IRGACURE 651 (trademark), Chiba Speciality Chemicals Corp.) is included as the photopolymerization initiator. By configuring the resin material in such a manner, the desiccating bonding agent 15 is irradiated by ultraviolet rays. Further, if 2-benzyl-2-dimethylamino-1-(4-morpholino phenyl)-butanone-1 (product name IRGACURE 369 (trademark), Chiba Speciality Chemicals Corp.), bis(2,4,6-trimethyl benzoyl)-phenyl phosphine oxide (product name IRGACURE 819 (trademark), Chiba Speciality Chemicals Corp.), or diphenyl(2,4,6-trimethyl benzoyl) phosphine oxide (product name SpeedCureTPO (trademark), DSKH Ltd.) is used as the photopolymerization initiator, curing is able to be performed by irradiating light in the visible light region.

Further, a thermosetting resin may be used for the desiccating bonding agent 15. If a thermosetting resin is used, it becomes possible to uniformly cure a resin composition layer that is provided from the front surface of the upper substrate 12 to the connection portion between the flexible wiring substrate 17 and the electrode 14. Furthermore, although regions in which curing is insufficient appear if there are portions in which light is blocked with a resin that is cured by irradiating light, by using a thermosetting resin, curing is able to be performed even for the resin in such light-blocked portions.

ESDRIMER (trademark), Nippon Steel Chemical Co, Ltd., for example, may be used as a thermosetting resin for the desiccating bonding agent 15. A photo-curable resin and a thermosetting resin may be used by mixing appropriately. Here, ESDRIMER (trademark), Nippon Steel Chemical Co, Ltd. is also a mixture of a photo-curable resin and a thermosetting resin.

In a case when a resin material is used as the desiccating bonding agent 15, it is preferable that the cure shrinkage rate be equal to or less than 5%. By setting the cure shrinkage rate to equal to or less than 5%, it is possible to reduce the internal stress that builds up on the resin cured material when curing a resin composition. In so doing, it is possible to suppress distortions that occur on interfaces between the desiccating bonding agent 15 and other configuration members that are in contact with the desiccating bonding agent 15.

Although not particularly limited in the display device 1, the viscosity of the resin material is preferably 1000 mPa·s to 5000 mPa·s from the viewpoint of the speed by which the liquid of the resin material spreads and the unlikeliness of the resin material from spilling out (surface tension). 2000 mPa·s to 3000 mPa·s is more preferable.

Otherwise, it is preferable that the desiccating bonding agent 15 satisfy the following conditions.

It is preferable that the desiccating bonding agent 15 have a water absorption rate of equal to or less than 10%. This is in order to prevent the infiltration of moisture into the connection portion between the flexible wiring substrate 17 and the electrode 14 and to suppress the degradation of the signal wire portion. Further, in a case when triacetyl cellulose is used for the configuration of the polarizer 18B, for example, the water absorption rate of the desiccating bonding agent 15 is caused to be less than the water absorption rate of triacetyl cellulose. In so doing, it becomes possible to prevent the desiccating bonding agent 15 that is provided between the front panel 16 and the polarizer 18B from absorbing moisture and the polarizer 18B from deteriorating.

If the desiccating bonding agent 15 is anticorrosive, corrosion of the connection portion between the flexible wiring substrate 17 and the electrode 14 and the vicinity thereof is able to be prevented.

Further, it is preferable that the transmissivity of the visible light region of the desiccating bonding agent 15 be equal to or greater than 90%. This is so that transmission of incident light to the front panel 16 from the upper substrate 12 is not prevented, while it is also possible to easily observe the connection portion between the flexible wiring substrate 17 and the electrode 14. In a case when the desiccating bonding agent 15 is composed of a photo-curable resin material, if the transmissivity of the visible light region of the desiccating bonding agent 15 is equal to or greater than 90%, light-blocked portions are not formed, and curing is able to be performed uniformly.

The refractive index (nD) of the desiccating bonding agent 15 is preferably equal to or greater than 1.43 and equal to or less than 1.61, and more preferably equal to or greater than 1.46 and equal to or greater than 1.58. This is so that the scattering and attenuation of imaging light that is incident from the display cell 10 is able to be suppressed in comparison with a case when air with a refractive index of 1.0 is caused to intervene between the display cell 10 and the front panel 16 and causes the difference in the refractive indices of the interfaces to be small. For example, although glass is able to be used for the upper substrate 12 and the front panel 16, the refractive index of glass is approximately 1.49 to 1.50. In a case when reinforced glass is used, the refractive index is approximately 1.55. Although an acrylic resin may be used as the front panel 16, the refractive index of an acrylic resin is approximately 1.51 to 1.52. Therefore, if the refractive index of the desiccating bonding agent 15 is as above, since the refractive index is equal to or less than ±0.06 or equal to or less than ±0.03 of the refractive index of the front panel 16, it is possible to cause the differences in the refractive indices of the interfaces to be small in comparison to a case when air is intervening between the display cell 10 and the front panel 16. If the refractive index of the desiccating bonding agent 15 is equal to or less than ±0.06 of the refractive index of the front panel 16, the refractive index becomes approximately equal to or less than 0.0005, and if the refractive index of the desiccating bonding agent 15 is equal to or less than ±0.03 of the refractive index of the front panel 16, the refractive index becomes approximately equal to or less than 0.0001. In so doing, it is possible to increase the brightness or the contrast of the imaging light from the upper substrate 12 and to improve the viewing characteristics.

In addition, if the linear expansion coefficient of the desiccating bonding agent 15 is equal to or less than $9 \times 10^{-4}$, warping of the display cell 10 due to changes in temperature, and stresses that occur in the connection portion between the flexible wiring substrate 17 and the electrode 14 from changes in temperature are able to be suppressed.

It is preferable that the storage elastic modulus of the desiccating bonding agent 15 at 25° C. be equal to or less than $1.0 \times 10^7$ Pa, and more preferably $1 \times 10^3$ to $1 \times 10^6$ Pa. In a case when the storage elastic modulus is high, there is a concern that distortion occurs between the display cell 10 and the front panel 16, and at the connection portion between the flexible wiring substrate 17 and the electrode 14. For example, in a case when the desiccating bonding agent 15 is composed of a resin material, even if the main resin components are common, the storage elastic modulus of the resin cured material changes if other dopant materials are different. It is preferable that dopant materials are also considered in order that the storage elastic modulus does not exceed $1.0 \times 10^7$ Pa.

The specification of the surface temperature of the display cell 10 that includes the liquid crystal layer 40 is ordinarily approximately 60° C. In order to prevent the deterioration of the desiccating bonding agent 15, it is preferable that the upper temperature limit of the desiccating bonding agent 15 be equal to or greater than 60° C.

It is preferable that the thermal conductivity of the desiccating bonding agent 15 be greater than 0.05 W/(m·K). This is because if the thermal conductivity of the desiccating bonding agent 15 is high, heat that is caused within the display cell 10 is able to be released by the desiccating bonding agent 15 that is provided between the front panel 16 and the display cell 10.

Manufacturing Method of Display Device 1

The display device 1 as described above is manufactured, for example, as follows.

First, the display cell 10 is manufactured. The liquid crystal layer 40 is sealed by a sealant (not shown) between the lower substrate 11 on which the wiring region 13 and the electrode 14 are disposed and the upper substrate 12 that includes a color filter (not shown). The polarizer 18B and the polarizer 18A are then respectively pasted on surfaces on the front surface side of the upper substrate 12 and the back surface side of the lower substrate 11.

Next, the ACF 19 is disposed between the electrode 14 and the flexible wiring substrate 17 of the wiring region 13, and the electrode 14 and the flexible wiring substrate 17 are caused to be electrically connected by thermocompression bonding.

A photo-curable resin composition, for example, is used for the desiccating bonding agent 15. The photo-curable resin composition is prepared by adding additives such as a sensitizer, a plasticizer, or transparent particles with a photo-sensitive acrylate material such as, for example, polyurethane acrylate or isobornyl acrylate and a photopolymerization initiator as base compounds.

After preparing the photo-curable resin composition, a predetermined amount of the photo-curable resin composition is added dropwise to the front surface of the upper substrate 12 (polarizer 18B) of the display cell 10 which is manufactured as described above. Other than adding dropwise, a printing method may be used. The front panel 16 is caused to be lowered while being maintained in a state of being horizontal to the display cell 10, and the front panel 16 is fixed at a predetermined position by a position-determining lifting mechanism. By slightly increasing the amount of photo-curable resin composition that is used here as compared to a case when only bonding of the front panel 16 and the display cell 10 is performed, the photo-curable resin composition reaches the connection portion between the flexible wiring substrate 17 and the electrode 14 through the ACF 19 along a side surface of the upper substrate 12 from the contact surface between the front panel 16 and the display cell 10. Since the connection portion between the flexible wiring substrate 17 and the electrode 14 is arranged in the vicinity of the upper substrate 12 in the wiring region 13, the photo-curable resin composition takes the form of covering the gap between the upper substrate 12 and the lower substrate 11 from a side surface of the upper substrate 12.

Next, the resin cured material is cured by irradiating ultraviolet rays or visible light on a resin composition that is provided between the upper substrate 12 and the front panel 16 and on the connection portion between the flexible wiring substrate 17 and the electrode 14. The ultraviolet rays or the visible light are selected in accordance with the photopolymerization initiator that is used. Although not particularly limited in the present embodiment, it is preferable that light be irradiated in a direction that is orthogonal to the front surfaces of the upper substrate 12 and the front panel 16. Further, light may be directly irradiated from the outer side surface side of the resin composition that is provided between the upper substrate 12 and the front panel 16 and on the connection portion between the flexible wiring substrate 17 and the electrode 14 by using, for example, an optical fiber or the like at the same time as when light is irradiated.

Finally, the display device 1 is completed by disposing the display cell 10 that includes the front panel 16 as described above along with a backlight unit 30 within an external member (not shown).

Actions and Effects of Display Device 1

With the display device 1, light is incident on the display cell 10 from the backlight unit 30. Such incident light penetrates the liquid crystal layer 40 after passing through the polarizer 18A while being modulated for each pixel based on image signals that are supplied to the upper substrate 12 and the lower substrate 11 through the flexible wiring substrate 17 from the driver IC 21. Light that penetrates the liquid crystal layer 40 is extracted to the outside of the polarizer 18B as color display light by passing through the upper substrate 12 that includes a color filter (not shown).

In the display device 1 of the present embodiment, since the fixing of the front panel 16 to the upper substrate 12 and the coating of the connection portion between the flexible wiring substrate 17 and the electrode 14 are both performed by the desiccating bonding agent 15, the number of materials used and the number of manufacturing steps are able to be reduced. In so doing, it is possible to keep manufacturing costs down.

In addition, it is possible to perform fixing of the front panel 16 to the upper substrate 12 and coating of the connection portion between the flexible wiring substrate 17 and the electrode 14 at the same time without having to provide a desiccant in advance.

Figure 5:
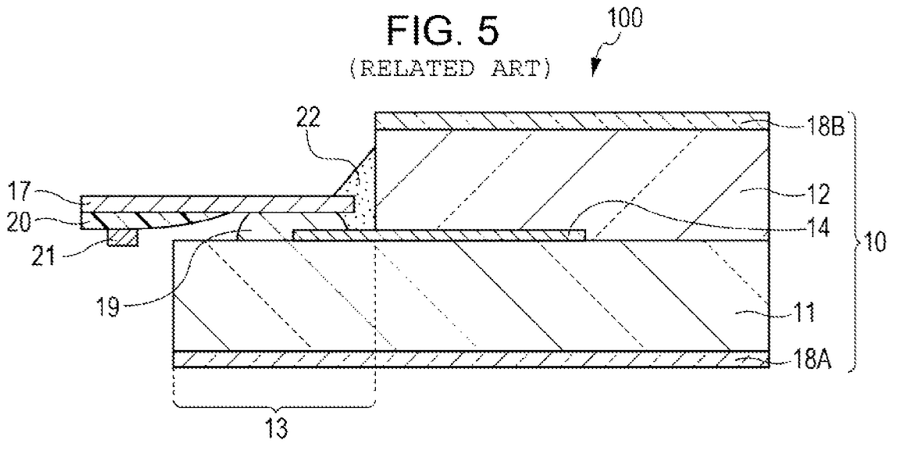
FIG. 5 is a side cross-sectional diagram that represents a configuration of a display device of the related art.

Although FIG. 5 represents a display device 100 of the related art in which a front panel is not provided, with such a form in which a front panel is not included, there was no particular problem even in a case when there was a large amount of desiccant 22. However, in a case when the front panel 16 is bonded with the display cell 10 as in the present embodiment, if the amount of the desiccant 22 is too great, the front panel 16 comes into contact with the desiccant 22, and it is difficult to bond the front panel 16 with the display cell 10 so as to be parallel. Further, if a photo-curable resin material is used as the bonding agent between the front panel 16 and the display cell 10, light is blocked by the desiccant 22, and portions that are not sufficiently cured appear. Furthermore, a problem in which the desiccant 22 is deteriorated by the irradiation of light is also caused.

On the other hand, in the present embodiment, for example, by providing a photo-curable resin composition between the upper substrate 12 and the front panel 16 and on the connection portion between the flexible wiring substrate 17 and the electrode 14 and curing the photo-curable resin composition by performing light irradiation thereon, fixing of the front panel 16 to the upper substrate 12 and coating of the connection portion between the flexible wiring substrate 17 and the electrode 14 are performed at the same time. Therefore, problems that had occurred by providing the desiccant in advance are resolved, and a highly reliable display device using simple manufacturing steps is able to be obtained.

Modified Example 1

Figure 3:
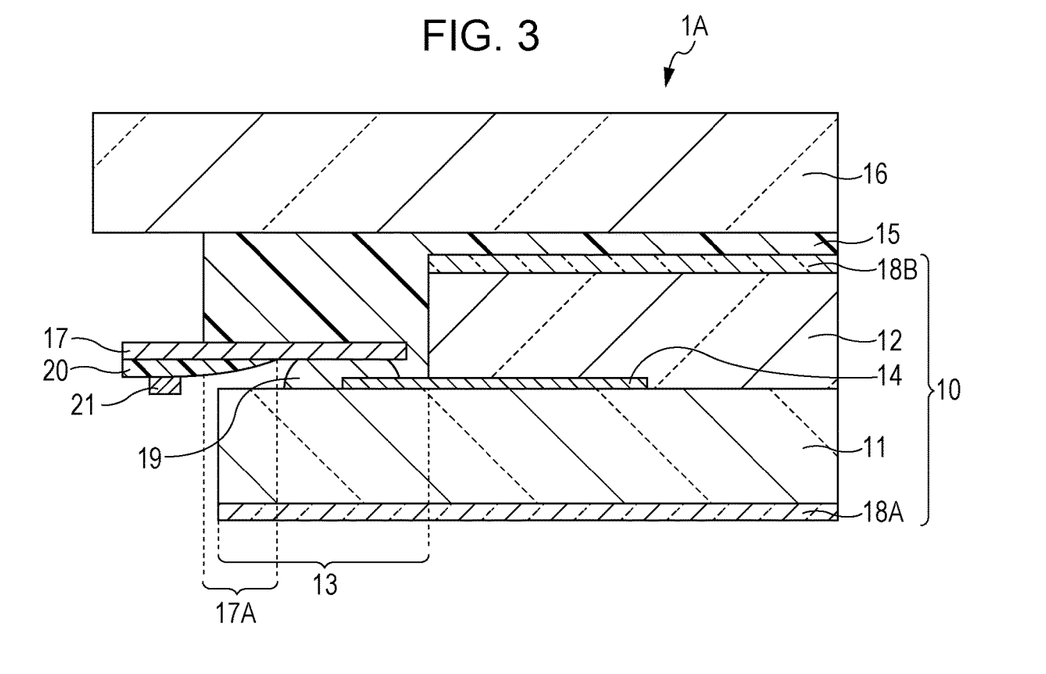
FIG. 3 is a side cross-sectional diagram that represents a configuration of a display device according to Modified Example 1.

FIG. 3 represents a side view of a display device 1A according to Modified Example 1 of the disclosure. In the display device 1A, the desiccating bonding agent 15 takes the form of also covering the front surface of the flexible wiring substrate 17 (opposing surface to the front panel 16) in addition to being provided via a side surface from the front surface of the upper substrate 12 to the connection portion between the flexible wiring substrate 17 and the electrode 14. The flexible wiring substrate 17 includes a duplicate region 17A in which a region that is covered by the desiccating bonding agent 15 and a region in which the solder resist 20 is provided overlap with the flexible wiring substrate 17 therebetween. By the flexible wiring substrate 17 including such a duplicate region 17A, it becomes possible to prevent the disconnection of the flexible wiring substrate 17 and to suppress the deterioration of the flexible wiring substrate 17. Other than such points, the display device 1A has the same configuration as the display device 1 of the embodiment described above, and the actions and the effects thereof are also the same.

Although the flexible wiring substrate 17 expands and contracts due to changes in temperature, stresses tend to concentrate on the wiring in the vicinity of the solder resist 20 since the elasticity thereof differs from that of the other portions due to the presence of the solder resist 20. Disconnections that occur due to the concentration of such stresses are one reason for the deterioration of the flexible wiring substrate 17.

In the display device 1A, the flexible wiring substrate 17 includes the duplicate region 17A with the flexible wiring substrate 17 therebetween, that is, the duplicate region 17A in which a region that is covered by the desiccating bonding agent 15 and a region in which the solder resist 20 of the back surface overlap. In so doing, it is possible to reinforce the portions in which stresses tend to concentrate due to changes in temperature, suppress bending that occurs in the flexible wiring substrate 17, and suppress the deterioration of the flexible wiring substrate 17 from disconnections.

It is preferable that the desiccating bonding agent 15 have a greater thermal conductivity than 0.05 W/(m·K). This is because heat that is generated at the flexible wiring substrate 17, in addition to the emission of heat within the display cell 10, is able to be diffused via the desiccating bonding agent 15 that covers the front surface of the flexible wiring substrate 17. In particular, in the display device 1A, the desiccating bonding agent 15 is continuously provided from the front surface of the upper substrate 12 to the front surface of the flexible wiring substrate 17. In so doing, heat that is generated at the flexible wiring substrate 17 is also able to be diffused to the front panel 16 that has high thermal conductivity. For example, the respective thermal conductivities of the glass and the acrylic resin that are used as the configuration materials of the front panel 16 are approximately 1 W/(m·K) and approximately 0.21 W/(m·K).

Furthermore, if the desiccating bonding agent 15 is insulating, it is possible to improve the insulating properties of the flexible wiring substrate 17 and suppress conduction.

In addition, if the desiccating bonding agent 15 is configured by a resin material with a cure shrinkage rate of equal to or less than 5%, distortions are able to be prevented from appearing on the interface between the desiccating bonding agent 15 and the flexible wiring substrate 17.

In a case when, for example, a resin composition is used for the desiccating bonding agent 15, the display device 1A is able to be manufactured in the same manner as the display device 1 of the embodiment described above by increasing the amount of resin composition that is added dropwise to the upper substrate 12.

Modified Example 2

Figure 4:
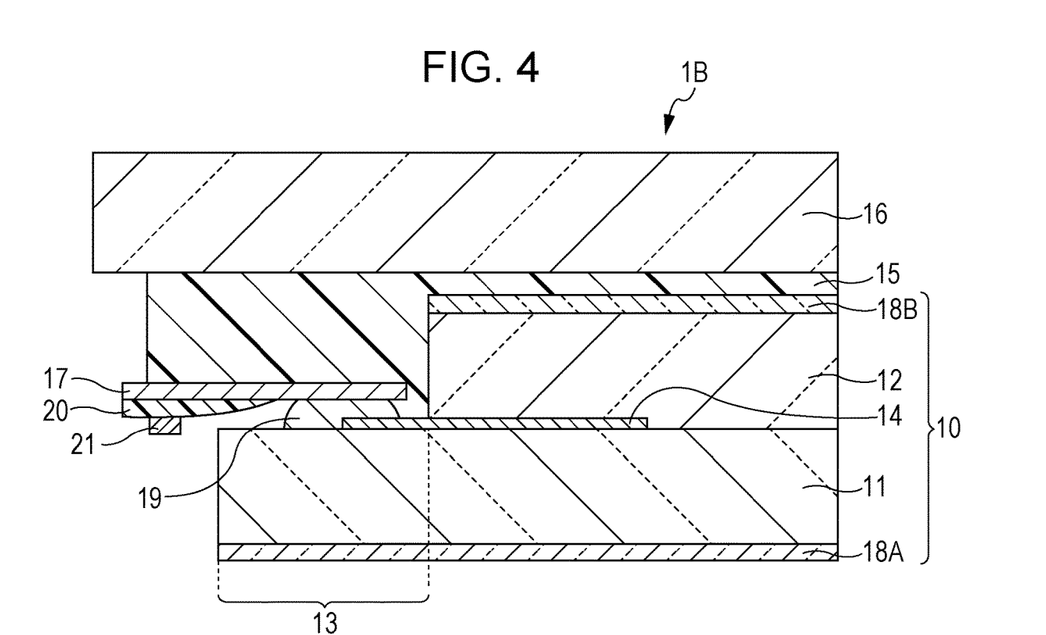
FIG. 4 is a side cross-sectional diagram that represents a configuration of a display device according to Modified Example 2.

FIG. 4 represents a side view of a display device 1B according to Modified Example 2 of the disclosure. In the display device 1B, the desiccating bonding agent 15 takes the form of also covering the front surface of the flexible wiring substrate 17 in addition to being provided via a side surface from the front surface of the upper substrate 12 to the connection portion between the flexible wiring substrate 17 and the electrode 14. The display device 1B according to Modified Example 2 differs from the display device 1A according to Modified Example 1 in that the desiccating bonding agent 15 is provided so as to cover the driver IC 21 with the flexible wiring substrate 17 therebetween. By the desiccating bonding agent 15 being provided so as to cover the driver IC 21 with the flexible wiring substrate 17 therebetween, the heat that is generated at the driver IC 21 is able to be diffused by the desiccating bonding agent 15. In so doing, it becomes possible to suppress the deterioration of the flexible wiring substrate 17 due to heat.

In the display device 1B, the desiccating bonding agent 15 is continuously provided from the front surface of the upper substrate 12 to the front surface of the flexible wiring substrate 17. In so doing, the heat that is generated at the driver IC 21 is also able to be diffused to the front panel 16. Other than such points, the display device 1B has the same configuration as the display device 1 of the embodiment described above, and the actions and the effects thereof are also the same.

In a case when a resin composition is used for the desiccating bonding agent 15, for example, by increasing the amount of resin composition that is added dropwise to the upper substrate 12, the display device 1B is able to be manufactured in the same manner as the display device 1 described above.

EXAMPLES

Next, description will be made by exemplifying specific Examples (Examples 1 to 4) of a display device according to embodiments of the disclosure.

Example 1

As Example 1, a resin composition as the material of desiccating bonding agent 15 was prepared by kneading 50 parts by weight of polyurethane acrylate (product name UV-3000B (trademark), The Nippon Synthetic Chemical Industry Co, Ltd.), 30 parts by weight of isobornyl acrylate (product name IBXA (trademark), Osaka Organic Chemical Industry Ltd.), 3 parts by weight of a photopolymerization initiator (product name IRGACURE 184 (trademark), Chiba Speciality Chemicals Corp.), and 1 part by weight of a visible light region photopolymerization initiator (product name SpeedCureTPO (trademark), DSKH Ltd.) in a kneading machine. After adding a predetermined amount of the resin composition dropwise to the front surface of the upper substrate 12, the front panel 16 was caused to be lowered while being maintained in a state of being horizontal to the display cell 10, and the front panel was fixed at a predetermined position by a position-determining lifting mechanism. The resin composition covered from the front surface of the upper substrate 12 past a side surface thereof to the connection portion between the flexible wiring substrate 17 and the electrode 14 and the front surface of the flexible wiring substrate 17. The desiccating bonding agent 15 was then formed by the resin composition being cured through irradiation with light via the front panel 16. The desiccating bonding agent 15 of Example 1 had a refractive index of 1.47, a cure shrinkage rate of 4.5%, and a storage elastic modulus (25° C.) of $1 \times 10^6$ Pa.

Example 2

As Example 2, a resin composition as the material of desiccating bonding agent 15 was prepared by kneading 70 parts by weight of an ester compound of a maleic anhydride adduct of a polyisoprene polymer and 2-hydroxyethyl methacrylate, 30 parts by weight of dicyclopentenyloxyethyl methacrylate, 10 parts by weight of 2-hydroxyethyl methacrylate, 30 parts by weight of a hydrogenated terpene resin, 140 parts by weight of a butadiene polymer, 4 parts by weight of a photopolymerization initiator (product name IRGACURE 184 (trademark), Chiba Speciality Chemicals Corp.), and 0.5 parts by weight of a visible light region photopolymerization initiator (product name SpeedCureTPO (trademark), DSKH Ltd.) in a kneading machine. After adding a predetermined amount of the resin composition dropwise to the front surface of the upper substrate 12, the front panel 16 was caused to be lowered while being maintained in a state of being horizontal to the display cell 10, and the front panel was fixed at a predetermined position by a position-determining lifting mechanism. The resin composition covered from the front surface of the upper substrate 12 past a side surface thereof to the connection portion between the flexible wiring substrate 17 and the electrode 14 and the front surface of the flexible wiring substrate 17. The desiccating bonding agent 15 was then formed by the resin composition being cured through irradiation with light via the front panel 16. The desiccating bonding agent 15 of Example 2 had a refractive index of 1.52, a cure shrinkage rate of 1.8%, and a storage elastic modulus (25° C.) of $1 \times 10^4$ Pa.

Example 3

As Example 3, a resin composition as the material of desiccating bonding agent 15 was prepared by kneading 100 parts by weight of an ester compound of a maleic anhydride adduct of a polyisoprene polymer and 2-hydroxyethyl methacrylate, 30 parts by weight of dicyclopentenyloxyethyl methacrylate, 10 parts by weight of 2-hydroxyethyl methacrylate, 30 parts by weight of a hydrogenated terpene resin, 210 parts by weight of a butadiene polymer, 7 parts by weight of a photopolymerization initiator (product name IRGACURE 184 (trademark), Chiba Speciality Chemicals Corp.), and 1.5 parts by weight of a visible light region photopolymerization initiator (product name SpeedCureTPO (trademark), DSKH Ltd.) in a kneading machine. After adding a predetermined amount of the resin composition dropwise to the front surface of the upper substrate 12, the front panel 16 was caused to be lowered while being maintained in a state of being horizontal to the display cell 10, and the front panel was fixed at a predetermined position by a position-determining lifting mechanism. The resin composition covered from the front surface of the upper substrate 12 past a side surface thereof to the connection portion between the flexible wiring substrate 17 and the electrode 14 and the front surface of the flexible wiring substrate 17. The desiccating bonding agent 15 was then formed by the resin composition being cured through irradiation with light via the front panel 16. The desiccating bonding agent 15 of Example 3 had a refractive index of 1.52, a cure shrinkage rate of 1.0%, and a storage elastic modulus (25° C.) of $4 \times 10^3$ Pa.

Example 4

As Example 4, a resin composition as the material of desiccating bonding agent 15 was prepared by kneading 70 parts by weight of an ester compound of a maleic anhydride adduct of a polyisoprene polymer and 2-hydroxyethyl methacrylate (product name UC-203 (trademark), Kuraray Co., Ltd.), 30 parts by weight of dicyclopentenyloxyethyl methacrylate (product name FA512M (trademark), Hitachi Chemical Company, Ltd.), 10 parts by weight of 2-hydroxyethyl methacrylate (product name Light Ester HOB (trademark), Kyoeisha Chemical Co., Ltd.), 30 parts by weight of a hydrogenated terpene resin (product name Clearon P-85 (trademark), Yasuhara Chemical Co, Ltd.), 35 parts by weight of a butadiene polymer (product name Polyoil 110 (trademark), Zeon Corporation), 5 parts by weight of a photopolymerization initiator (product name IRGACURE 184D (trademark), Chiba Speciality Chemicals Corp.), and 2 parts by weight of a visible light region photopolymerization initiator (product name SpeedCureTPO (trademark), DSKH Ltd.) in a kneading machine. After adding a predetermined amount of the resin composition dropwise to the front surface of the upper substrate 12, the front panel 16 was caused to be lowered while being maintained in a state of being horizontal to the display cell 10, and the front panel 16 was fixed at a predetermined position by a position-determining lifting mechanism. The resin composition covered from the front surface of the upper substrate 12 past a side surface thereof to the connection portion between the flexible wiring substrate 17 and the electrode 14 and the front surface of the flexible wiring substrate 17. The desiccating bonding agent 15 was then formed by the resin composition being cured through irradiation with light via the front panel 16. The desiccating bonding agent 15 of Example 4 had a refractive index of 1.52, a cure shrinkage rate of 3.8%, and a storage elastic modulus (25° C.) of $4 \times 10^5$ Pa.

The desiccating bonding agent 15 of all of Examples 1 to 4 also had a water absorption rate of equal to or less than 10%, anticorrosive properties, light transmissivity of the visible light region of equal to or more than 90%, a linear expansion coefficient of equal to or less than $9 \times 10^4$, an upper temperature limit of equal to or greater than 60° C., and a thermal conductivity of equal to or greater than 0.05 W/(m·K).

The refractive index was measured by a refractometer (Atago Co., Ltd., Model-3). The cure shrinkage rate (%) was calculated, by measuring the specific gravity of a resin before and after curing using an electronic densimeter (Alfa Mirage Co., Ltd., SD-120L), from the difference in the specific gravity. The storage elastic modulus (Pa) was measured at 25° C. at a measuring frequency of 1 Hz by a viscoelasticity measuring device (Seiko Instruments Inc., DMS6100).

The water absorption rate was measured as follows. First, the desiccating bonding agent 15 was dried in an oven at 50° C. for 24 hours and cooled to room temperature in a desiccator. Mass m1 of a dried state was obtained by repeating such a process until the change in mass was equal to or less than ±0.1 mg. Next, mass m2 of a hydrated state was obtained after immersing the desiccating bonding agent 15 in distilled water at 23° C. for 24 hours and wiping the moisture from the surface. The water absorption rate was measured using the ratio between the mass m1 and the mass m2.

Comparative Example

Figure 6:
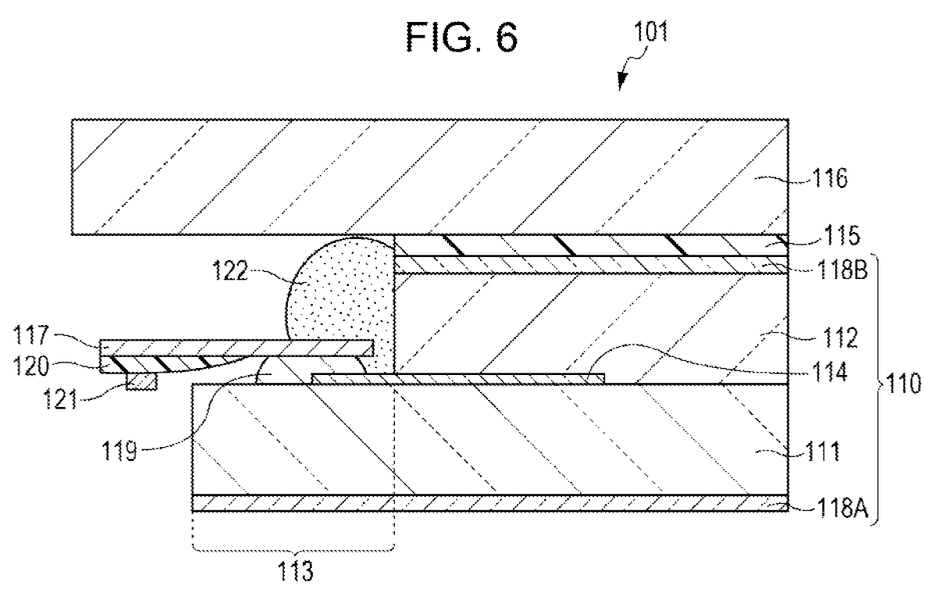
FIG. 6 is a side cross-sectional diagram that represents a configuration of a display device according to Comparative Example.
Figure 7:
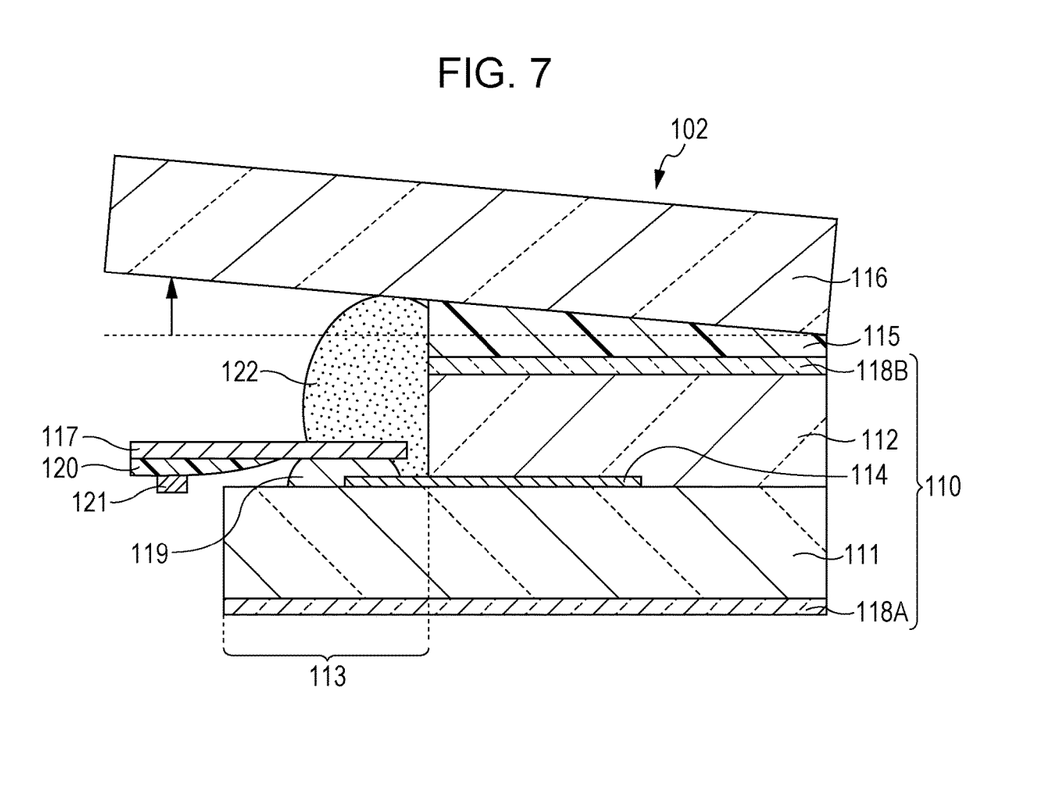
FIG. 7 is a side cross-sectional diagram that represents a configuration of another display device according to Comparative Example.

As a comparative example to Examples 1 to 4 described above, display devices 101 and 102 that are illustrated in FIGS. 6 and 7 were manufactured using a display cell 110 in which a desiccant 122 is formed on a connection portion between a flexible wiring substrate 117 and an electrode 114 in advance. In FIGS. 6 and 7, the corresponding parts are given symbols in the order of 100s. First, a predetermined amount of a photo-curable resin composition that configures a desiccating bonding agent 115 was added dropwise to the front surface of an upper substrate 112 of the display cell 110 on which the desiccant 122 is formed in advance, and similarly to Examples 1 to 4, a front panel 116 was caused to be lowered while being maintained in a state of being horizontal to the display cell 110, and the front panel 116 was fixed at a predetermined position by a position-determining lifting mechanism. Compared to Examples 1 to 4, the amount of resin composition that is used was slightly reduced. The display devices 101 and 102 were then manufactured by curing the resin composition by irradiating light via the front panel 116. Here, at the same time as being performed via the front panel 116 and in a direction that is orthogonal to the front surfaces of the upper substrate 112 and the front panel 116, light irradiation was also performed directly from the outer side surface side using an optical fiber or the like.

In such a manner, display devices were manufactured according to Examples 1 to 4 and Comparative Example, and tests relating to the observation of the appearance and the reliability of each were conducted.

In Examples 1 to 4, curing of the resin composition by light irradiation was sufficiently performed, and it was possible to fix the front panel 16 to the display cell 10 in a parallel manner while the coating of the connection portion between the flexible wiring substrate 17 and the electrode 14 were performed completely.

As a result of observing the appearances of the display devices 1 that were manufactured in Examples 1 to 4, there were hardly any distortions between the display cell 10 and the front panel 16, at the connection portion between the flexible wiring substrate 17 and the electrode 14, and on the interface between the flexible wiring substrate 17 and the desiccating bonding agent 15. This is because a desiccating bonding agent 15 with a storage elastic modulus as described above was used. Further, since a desiccating bonding agent 15 with a linear expansion coefficient of equal to or less than $9 \times 10^{-4}$ was used, it was possible to suppress warping of the display cell 10 and stresses that are caused on the connection portion between the flexible wiring substrate 17 and the electrode 14.

In the display devices 1 that were manufactured in Examples 1 to 4, after performing preservation tests under the condition of 50° C. with a relative humidity of 80% for 250 hours, there were no abnormalities observed in any of the display devices 1 of Examples 1 to 4. It was therefore confirmed that if the desiccating bonding agent 15 has a water absorption rate of equal to or less than 10% and is anticorrosive, the desiccating bonding agent 15 is not easily influenced by humidity.

Furthermore, preservation tests with a heat cycle of −20° C. to 60° C. over 250 hours were performed on the display devices 1 that were manufactured in Examples 1 to 4. There were no abnormalities observed in any of the display devices 1 of Examples 1 to 4. It was confirmed that by using a desiccating bonding agent 15 with a linear expansion coefficient of equal to or less than $9 \times 10^{-4}$ as described above, the desiccating bonding agent 15 is not easily influenced by changes in temperature.

Since a desiccating bonding agent 15 that is insulating was used, the surface resistance of the flexible wiring substrate 17 was equal to or greater than $10^{10}\Omega$. Conduction was able to be suppressed by improving the insulating properties of the flexible wiring substrate 17.

Although preservation tests at 60° C. for 250 hours and at 60° C. for 500 hours were conducted for the display devices 1 of Examples 1 to 4, abnormalities were observed in neither. This is because by using a desiccating bonding agent 15 with an upper temperature limit of equal to or greater than 60° C., deterioration of the desiccating bonding agent 15 itself does not take place, and since the thermal conductivity is equal to or greater than 0.05 W/(m·K), the generation of heat from the flexible wiring substrate 17 and the heat within the display cell 10 could be efficiently diffused.

Here, compared to a case when a display device is manufactured without providing the desiccating bonding agent 15 between the display cell 10 and the front panel 16, it was seen that the surface temperature of the display cell 10 was approximately 5° C. lower. A heat radiating effect of the desiccating bonding agent 15 was thereby also confirmed.

On the other hand, with the display device 101 of Comparative Example, as illustrated in FIG. 6, even if light irradiation is performed directly from the outer side surface side on the resin composition that is between the upper substrate 112 and the front panel 116 using an optical fiber or the like, light irradiation is impeded by the desiccant 122, and curing of the outside of the resin composition became insufficient. In particular, such a phenomenon was observed in a case when a silicone resin was used as the desiccant 122.

Further, with the display device 102 of Comparative Example, in a case when the desiccant 122 protruded out further to the front surface side than the upper substrate 112 as illustrated in FIG. 7, the front panel 116 came into contact with the desiccant 122, and it was difficult to bond the front panel 116 with the display cell 110 in a parallel manner.

Although the disclosure has been described above by exemplifying embodiments and modified examples, the disclosure is not limited to the embodiments described above, and various modifications are possible. For example, although a liquid crystal display device in which a liquid crystal layer is provided between the upper substrate 12 and the lower substrate 11 has been exemplified in the embodiment described above, as long as the configurations of the wiring portion are the same, the disclosure is able to be applied to other display devices such as a plasma display device or an organic electroluminescent display device.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
   a display cell that includes:
   a first substrate;
   a second substrate that opposes the first substrate;
   a plurality of wiring regions that are on the second substrate in a plurality of regions of the second substrate, the plurality of wiring regions having at least a portion thereof that extends beyond a side surface of the first substrate; and
   an electrode in each of the plurality of wiring regions;
   a wiring substrate in a wiring region of the plurality of wiring regions, wherein at least a portion of the wiring substrate is arranged to cover at least a part of an electrode in the wiring region and the at least the portion of the wiring substrate is electrically connected to the electrode;
   a front panel that is provided on a first surface of the first substrate; and
   a bonding agent that is located in each wiring region of the plurality of wiring regions, the bonding agent configured to fix the front panel to the first substrate while covering from at least a portion of the side surface of the first substrate to a connection portion between the electrode and the wiring substrate without coming into contact with the second substrate, wherein
   the wiring substrate includes an integrated circuit fixed to a second surface of the wiring substrate by a solder resist,
   the bonding agent in each wiring region of the plurality of wiring regions, on the first surface of the wiring substrate, covers the integrated circuit with the wiring substrate therebetween, the first and second surfaces of the wiring substrate located on opposite sides of the wiring substrate,
   the bonding agent includes a first side surface and a second side surface, the first side surface opposing the second side surface, the first side surface abutting the side surface of the first substrate and the second side surface extending beyond the second substrate in a direction extending from the side surface of the first substrate such that the bonding agent does not fully cover the wiring substrate, and
   the wiring substrate includes a duplicate region that is covered (i) by the bonding agent on the first surface of the wiring substrate and (ii) the solder resist on the second surface of the wiring substrate so as to reinforce a structure of the wiring substrate against stresses imposed due to a change in temperature.

2. The display device according to claim 1, wherein the bonding agent is provided from a bonding surface between the first substrate and the front panel to the connection portion via the side surface of the first substrate.

3. The display device according to claim 1, wherein the electrode and the wiring substrate are electrically connected by an anisotropic conductive film.

4. The display device according to claim 1, wherein a transmissivity in a visible light region of the bonding agent is equal to or greater than 90%.

5. The display device according to claim 1, wherein a water absorption rate of the bonding agent is equal to or less than 10%.

6. The display device according to claim 1, wherein the front panel is fixed to the first substrate with a polarizer therebetween.

7. The display device according to claim 1, wherein the wiring substrate is flexible.

8. The display device according to claim 1, wherein the connection portion is coated with the bonding agent in a state that the front panel is fixed to the first substrate.

9. The display device according to claim 1, wherein the bonding agent covers at least a portion of the wiring substrate so as to cover an end of the wiring substrate closest to the side surface of the first substrate so that the wiring substrate has a first region covered by the bonding agent and a second region having a solder resist thereon, the first region and the second region overlapping with the wiring substrate therebetween.

10. The display device according to claim 1, wherein the bonding agent is a desiccating bonding agent.

11. The display device according to claim 1, wherein the bonding agent has a linear expansion coefficient that is less than or equal to $9 \times 10^{-4}$.

12. The display device according to claim 1, wherein the bonding agent has an upper temperature limit that is greater than or equal to 60 degrees Celsius.

13. The display device according to claim 1, wherein the bonding agent has a thermal conductivity that is greater than or equal to 0.05 W/(m*K).

14. A display device, comprising:
a display cell that includes:
a first substrate;
a second substrate that opposes the first substrate;
a plurality of wiring regions that are on the second substrate in a plurality of regions of the second substrate, the plurality of wiring regions having at least a portion thereof that extends beyond a side surface of the first substrate; and
an electrode in each of the plurality of wiring regions;
a plurality of wiring substrates, each wiring substrate of the plurality of wiring substrates in a wiring region of the plurality of wiring regions, wherein at least a portion of the plurality of wiring substrates is arranged to cover at least a part of a corresponding electrode and the at least the portion of the plurality of wiring substrates is electrically connected to the electrode;
a front panel that is provided on a first surface of the first substrate; and
a bonding agent that is located in each wiring region of the plurality of wiring regions, the bonding agent configured to fix the front panel to the first substrate such that the bonding agent covers at least a portion of the side surface of the first substrate to a surface of the wiring substrates present opposite to a surface of the front panel without coming into contact with the second substrate, wherein
the bonding agent includes a first side surface and a second side surface, the first side surface opposing the second side surface, the first surface abutting the side surface of the first substrate and the second side surface extending beyond the second substrate in a direction extending from the side surface of the first substrate such that the bonding agent does not fully cover the wiring substrate.

15. The display device according to claim 14, wherein the bonding agent is a desiccating bonding agent.

16. The display device according to claim 14, wherein the connection portion is coated with the bonding agent in a state that the front panel is being fixed to the first substrate.

17. The display device according to claim 14, wherein the bonding agent covers at least a portion of each of the wiring substrates so as to cover an end of each wiring substrate closest to the side surface of the first substrate so that each wiring substrate has a first region covered by the bonding agent and a second region having a solder resist thereon, the first region and the second region overlapping with the wiring substrate therebetween.

18. A display device, comprising:
a display cell that includes:
a first substrate;
a second substrate that opposes the first substrate;
a plurality of wiring regions that are on the second substrate in a plurality of regions of the second substrate, the plurality of wiring regions having at least a portion thereof that extends beyond a side surface of the first substrate; and
an electrode in each of the plurality of wiring regions;
a plurality of wiring substrates, each wiring substrate of the plurality of wiring substrates in a wiring region of the plurality of wiring regions, wherein at least a portion of the plurality of wiring substrates is arranged to cover at least a part of a corresponding electrode and the at least the portion of the plurality of wiring substrates is electrically connected to the electrode;
a front panel that is provided on a first surface of the first substrate; and
a bonding agent that is located in each wiring region of the plurality of wiring regions, the bonding agent configured to fix the front panel to the first substrate such that the bonding agent covers at least a portion of the side surface of the first substrate to a surface of the wiring substrates present opposite to a surface of the front panel without coming into contact with the second substrate, wherein
each wiring substrate of the plurality of wiring substrates includes a duplicate region that is covered by (i) the bonding agent on a first surface of a respective wiring substrate and (ii) a solder resist on a second surface of the respective wiring substrate so as to reinforce a structure of the wiring substrates against stresses imposed due to a change in temperature, and
the bonding agent includes a first side surface and a second side surface, the first side surface opposing the second side surface, the first surface abutting the side surface of the first substrate and the second side surface extending beyond the second substrate in a direction extending from the side surface of the first substrate such that the bonding agent does not fully cover the wiring substrate.

19. The display device according to claim 18, wherein the connection portion is coated with the bonding agent in a state that the front panel is fixed to the first substrate.

20. The display device according to claim 18, wherein the bonding agent covers at least a portion of each respective wiring substrate so as to cover an end of the wiring substrate closest to the side surface of the first substrate so that the wiring substrate has a first region covered by the bonding agent and a second region having the solder resist thereon, the first region and the second region overlapping with the wiring substrate therebetween.

21. The display device according to claim 18, wherein the bonding agent is a desiccating bonding agent.

* * * * *